US009363092B2

(12) United States Patent  
Crawley et al.

(10) Patent No.: US 9,363,092 B2  
(45) Date of Patent: Jun. 7, 2016

(54) SELECTING A VIDEO DATA STREAM OF A VIDEO CONFERENCE

(71) Applicant: International Business Machines Corporation, Armonk, NY (US)

(72) Inventors: John A. Crawley, Dublin (IE); Dalia M. Havens, Austin, TX (US); Lakshmi S. Meda, Navan (IE); Mark E. Wallace, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 13/665,210

(22) Filed: Oct. 31, 2012

(65) Prior Publication Data

US 2014/0122657 A1 May 1, 2014

(51) Int. Cl.  
*G06F 15/16* (2006.01)  
*H04L 12/18* (2006.01)  
*H04N 7/15* (2006.01)

(52) U.S. Cl.  
CPC ........ *H04L 12/1827* (2013.01); *H04L 12/1813* (2013.01); *H04N 7/152* (2013.01)

(58) Field of Classification Search  
USPC .................... 709/206; 348/14.08, 14.09, 14.1  
See application file for complete search history.

(56) References Cited

U.S. PATENT DOCUMENTS

| 6,128,649 | A | 10/2000 | Smith et al. |
| 7,151,753 | B2 * | 12/2006 | Chaney et al. ................ 370/261 |
| 7,185,054 | B1 | 2/2007 | Ludwig et al. |
| 7,668,907 | B1 | 2/2010 | Janakiraman et al. |
| 7,679,638 | B2 | 3/2010 | Eshkoli et al. |
| 7,679,640 | B2 | 3/2010 | Eshkoli et al. |
| 7,797,383 | B2 | 9/2010 | Baird |
| 8,208,000 | B1 * | 6/2012 | Swanson et al. ........... 348/14.08 |
| 8,365,236 | B2 * | 1/2013 | Krikorian et al. ............... 725/94 |
| 8,401,869 | B2 * | 3/2013 | Renzi et al. ....................... 705/2 |
| 2004/0068648 | A1 * | 4/2004 | Lewis et al. ................... 713/153 |
| 2007/0050828 | A1 * | 3/2007 | Renzi et al. ..................... 725/93 |
| 2010/0037151 | A1 * | 2/2010 | Ackerman ............. G06Q 10/10 715/753 |
| 2010/0315484 | A1 | 12/2010 | Ramanathan et al. |
| 2011/0090301 | A1 * | 4/2011 | Aaron et al. ............... 348/14.08 |
| 2011/0271205 | A1 * | 11/2011 | Jones .................... H04N 7/157 715/753 |
| 2011/0279637 | A1 * | 11/2011 | Periyannan et al. ....... 348/14.09 |
| 2011/0279639 | A1 * | 11/2011 | Anand et al. .............. 348/14.09 |
| 2012/0266258 | A1 * | 10/2012 | Tuchman et al. ............... 726/28 |
| 2013/0162753 | A1 * | 6/2013 | Hendrickson et al. ..... 348/14.08 |

* cited by examiner

*Primary Examiner* — Shirley Zhang  
(74) *Attorney, Agent, or Firm* — Abdul-Samad Adediran

(57) ABSTRACT

Computer program code receives input information for setup a video conference, and attributes of participants associated with one or more video endpoints in the video conference. The program code parses the input information to determine whether there are video data streams available for broadcast, and parameters in an access control file granting one or more of the participants a right to control which of the video data streams available for broadcast they view. The program code extracts parameters from the input information. The program code stores the parameters that are extracted as metadata. The program code compares the metadata with the attributes of the participants associated with the one or more video endpoints to determine matches. The program code requests a multipoint control unit to send one or more of the video data streams based on the access control file, criteria specified by the participants, and the matches determined.

3 Claims, 4 Drawing Sheets

SELECTING A VIDEO DATA STREAM OF A VIDEO CONFERENCE

BACKGROUND

1. Field of the Invention

The present invention relates generally to video conferencing, and more specifically to selecting a video data stream of a video conference to send to a video endpoint associated with a video conference participant, based on parameters representing attributes of each participant in the video conference.

2. Description of the Related Art

The use of integrated circuits and computing devices have enabled the digitization of video, and with the expansion of the Internet many technological advancements have been made in the area of video conferencing technology. Particularly, video conferencing technology has been widely adopted by enterprises to provide a collaborative environment that allows an interactive exchange of information via video data streams between computing and display devices of video conference participants (participants) such as, for example, employees, business partners, and customers, some of whom can be at different geographical locations. In addition, video conferencing technology is frequently used in educational settings to allow participants such as students and teachers in different geographical locations to virtually collaborate and share information via a video conference. Thus, a video conference can contain participants that are at the same locations (i.e., local), or a combination of participants that are local and participants that are at different locations. As a result, a local participant in a video conference may not need to view video data streams of other local participants in the video conference. For example, if in a video conference there are at least some local participants each having their own video endpoint, physically located in the same room, and can see each other in person during the video conference, then such local participants may not need to view each video data stream of the video conference.

Current solutions for video conferencing tend to work by merely showing, on a display screen, only the participant designated as the active speaker. However, if only the participant designated as the active speaker is shown, then not all participants can gauge responses of each other via body language, which is frequently needed for effective negotiating. An alternative solution for video conferencing includes showing all participants, wherein the participant designated as the active speaker is shown in a large area of the display screen and all other participants are shown in smaller areas of the display screen. If all participants are shown, then there can be video data streams for certain participants in the video conference that not all participants need to view, for reasons one of which is mentioned above (i.e., certain participants are located in the same room). In addition, in regard to the alternative solution, as the designation of active speaker changes participants can end up moving from one area on the display screen to another area on the display screen, which can cause difficulties for a participant trying to locate and keep track of where another participant is located on the display screen.

SUMMARY

Aspects of an embodiment of the present invention disclose a method, computer system, and program product for selecting a video data stream of a video conference to send to a video endpoint. Computer program code receives input information and attributes of participants associated with one or more video endpoints in a video conference. The computer program code parses the input information for parameters representing attributes selected from a configurable predefined list of values to determine whether there are video data streams available for broadcast, and whether there are parameters in an access control file granting one or more of the participants a right to control which of the video data streams available for broadcast they view. The computer program code extracts from the input information, based on the parsing, the parameters representing the attributes selected from the configurable predefined list of values, wherein the parameters representing the attributes selected define the video data streams available for broadcast. The computer program code stores the parameters that are extracted from the input information, as metadata associated with the video conference. The computer program code compares the metadata with the attributes of the participants associated with the one or more video endpoints to determine matches. The computer program code requests a multipoint control unit to send one or more of the video data streams available for broadcast to the one or more video endpoints based on the access control file, criteria specified by the participants, and the matches that are determined.

BRIEF DESCRIPTION OF THE SEVERAL VIEWS OF THE DRAWINGS

The subject matter that is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Figure 1:
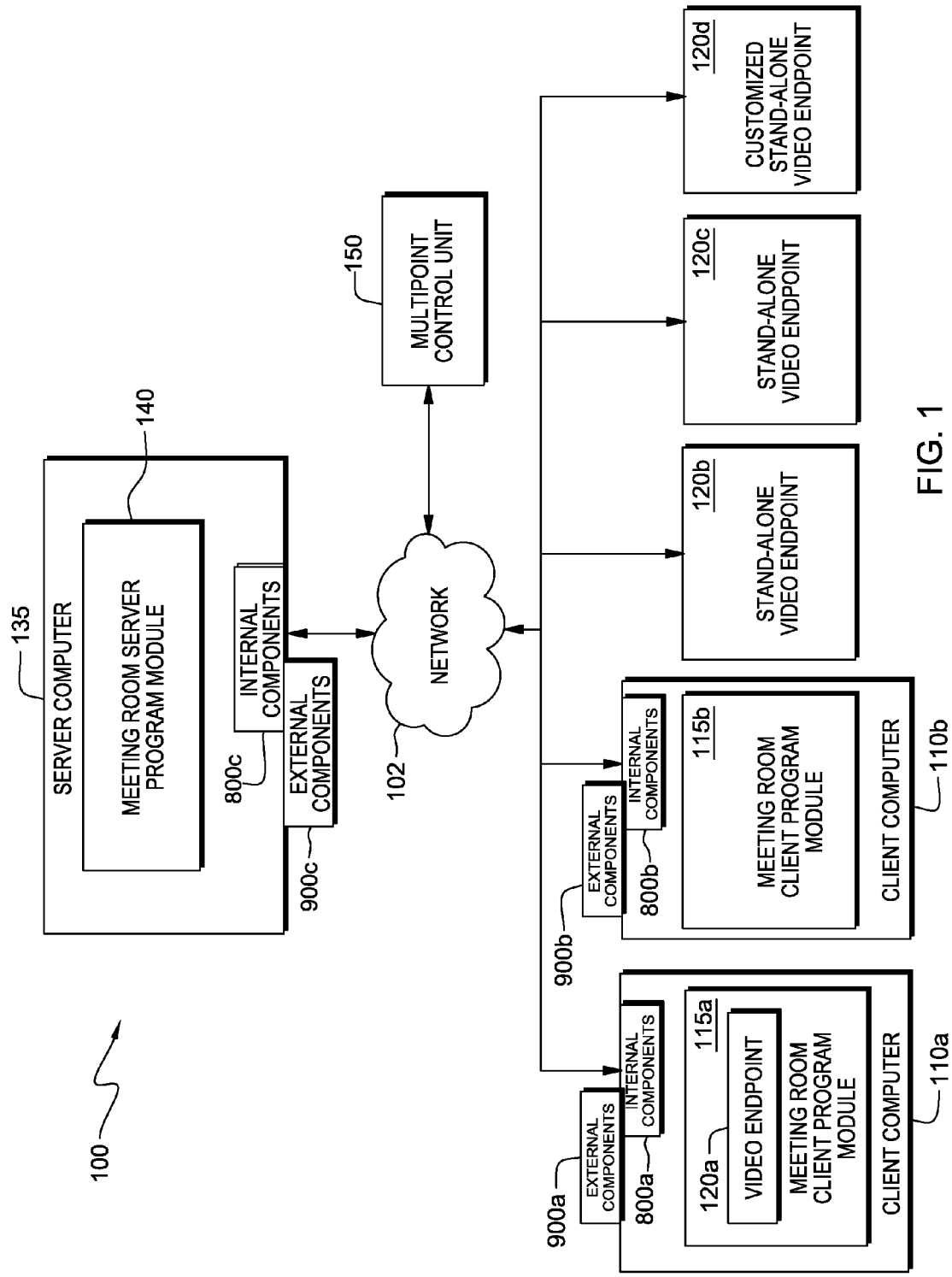
FIG. 1 is a block diagram of a video conferencing computer system having a server computer installed with a meeting room server program module, client computers each installed with a meeting room client program module, and video endpoints some of which are integrated with a meeting room client program module according to an embodiment of the present invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as JAVA, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure can, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques can be omitted to avoid unnecessarily obscuring the presented embodiments.

Embodiments of the present invention provide computer program code for selecting a video data stream of a video conference to send to a video endpoint associated with a video conference participant (participant), wherein the selection is based on parameters representing attributes of one or more participants in the video conference.

In one embodiment, the computer program code includes a client program module on a client computer, and a server program module on a server computer. The client program module can be integrated with a video endpoint such as, for example, an embedded video endpoint, or a stand-alone video endpoint. Moreover, the client program module includes functionality for an end-user to create a video conference by entering input information, wherein entering input information includes selecting parameters representing attributes of participants in the video conference. The selected parameters representing the attributes define video data streams from video endpoints that are available for broadcast. The client program module further includes functionality for storing the selected parameters representing the attributes as metadata. Particularly, the selected parameters representing the attributes can be stored locally on the client computer, for example in a file or database, as metadata associated with the video conference. The client program module can send the metadata associated with the video conference to the server program module, and the server program module can utilize the metadata received to determine the video data streams from each video endpoint, that are available for broadcast to send to other video endpoints.

A video endpoint can include a camera, microphone, or combination thereof having functionality for collecting video and/or audio from a participant in a video conference. Each video endpoint is programmatically configured to send the video and/or audio as well as attributes of each participant associated with the video endpoint, to the server program module via a multipoint control unit. Thus, a video endpoint can have a user interface with functionality for a participant or a system programmer/administrator to input parameters representing attributes of each participant associated with the video endpoint, wherein the attributes can include: an internet protocol address (IP address) associated with the video endpoint, a physical address of each participant, a job description of each participant, a membership in a collaborative network, and other attributes based on needs and design requirements of a customer or an end-user of the computer program code. In addition, the server program module can compare the metadata, mentioned above, with the attributes of each participant associated with a particular video endpoint and determine whether to request the multipoint control unit to send the collected video and/or audio as a video data stream to that particular video endpoint. Thus, embedded video endpoints and standalone video endpoints can also include a computer display monitor or other type of display screen, a speaker, or combination thereof for receiving one or more video data stream and/or entering input parameters representing attributes of each participant associated with a video endpoint.

Moreover, various protocols can be utilized for transmitting the video data streams between video endpoints via the multipoint control unit. Specifically, the multipoint control unit can send and receive video data streams using protocols that can include the following: 3G-324M Protocol, H.323 Protocol, T.120 Protocol, Centralized Conferencing Manipulation Protocol (CCMP), Real-Time Protocol (RTP), Session Initiation Protocol (SIP), Transmission Control Protocol (TCP, also TCP/IP), User Datagram Protocol (UDP), or a combination thereof. Specifically, the server program module on the server computer can instruct the multipoint control unit on which video data streams to send to video endpoints based on attributes of each participant associated with the respective video endpoints, wherein the multipoint control unit can utilize one or more of the protocols mentioned above.

In other embodiments, there can be a stand-alone video endpoint that is not integrated with a client program module, but can still interact with the server program module via the multipoint control unit as described above. However, in still other embodiments, a customized stand-alone video endpoint that is not integrated with a client program module can be programmatically configured to interact directly with both the multipoint control unit and the server program module in order to send, receive, display, and/or play one or more video data streams of the video conference. Specifically, a customized stand-alone video endpoint can send video and/or audio as well as attributes of each participant associated with the video endpoint directly to the server program module, or via the multipoint control unit to the server program module.

FIG. 1 illustrates video conferencing computer system 100 that includes network 102, client computers 110a and 110b, embedded video endpoint 120a, stand-alone video endpoints 120b and 120c, customized stand-alone video endpoint 120d, server computer 135, and multipoint control unit (MCU) 150. In addition, client computers 110a and 110b each include respective internal components 800a and 800b, and respective external components 900a and 900b. Moreover, server computer 135 includes internal components 800c and external components 900c. Internal components 800a-800c, and respective external components 900a-900c are described below in more detail with respect to FIG. 3.

In the disclosed embodiment, client computer 110a is installed with meeting room client program module 115a that is integrated with embedded video endpoint 120a, and server computer 135 is installed with meeting room server program module 140. Embedded video endpoint 120a can allow a participant to listen to and/or view a video data stream of a video conference. For example, embedded video endpoint 120a can be a display screen with speakers (e.g., a computer display monitor), on client computer 110a, which can be utilized to view and/or listen to a video data stream of the video conference. Specifically, embedded video endpoint 120a can be configured to interact with MCU 150 and meeting room client program module 115a in order to send, receive, display, and/or play one or more video data streams of the video conference. In addition, embedded video endpoint 120a can also send to meeting room server program module 140 attributes of each participant associated with embedded video endpoint 120a. Specifically, embedded video endpoint 120a has a user interface with functionality for a participant or a system programmer/administrator to enter attributes of each participant associated with one or more of video endpoints 120a-120d, wherein the attributes can include: internet protocol addresses (IP addresses) associated with respective video endpoints 120a-120d, physical address of each participant, a job description of each participant, a membership in a collaborative network, and other attributes based on needs and design requirements of a customer or an end-user of meeting room client program module 115a and meeting room server program module 140.

In addition, in the disclosed embodiment, client computer 110b is installed with meeting room client program module 115b, which interacts with stand-alone video endpoint 120b. Stand-alone video endpoint 120b can be any device for sending or receiving video and/or audio from a participant in the video conference (e.g., a computing device running video conferencing software, a mobile device running a video conferencing application, or a video room system). Stand-alone video endpoint 120b can interact with meeting room server program module 140 via MCU 150. In addition, stand-alone video endpoint 120b also has the user interface, described above with respect to video endpoint 120a, with functionality for a participant or a system programmer/administrator to enter attributes of each participant associated with one or more of respective video endpoints 120a-120d.

Furthermore, as mentioned above, video conferencing computer system 100 includes stand-alone video endpoint 120c and customized stand-alone video endpoint 120d. Stand-alone video endpoint 120c and customized stand-alone video endpoint 120d can both interact with meeting room server program module 140 via MCU 150, but stand-alone video endpoint 120c and customized stand-alone video endpoint 120d are not integrated with any client program module (e.g., meeting room client program module 115a or 115b). Moreover, customized stand-alone video endpoint 120d is programmatically configured to interact directly with both multipoint control unit 150 and meeting room server program module 140 in order to send, receive, display, and/or play one or more video data streams of the video conference. Thus, customized stand-alone video endpoint 120d contains additional functionality to communicate directly with server computer 135, but such additional functionality is not available on stand-alone video endpoints 120b and 120c. Furthermore, stand-alone video endpoint 120c and customized stand-alone video endpoint 120d also each have the user interface, described above with respect to video endpoint 120a, with functionality for a participant or a system programmer/administrator to enter attributes of each participant associated with one or more of respective video endpoints 120a-120d.

Figure 2A:
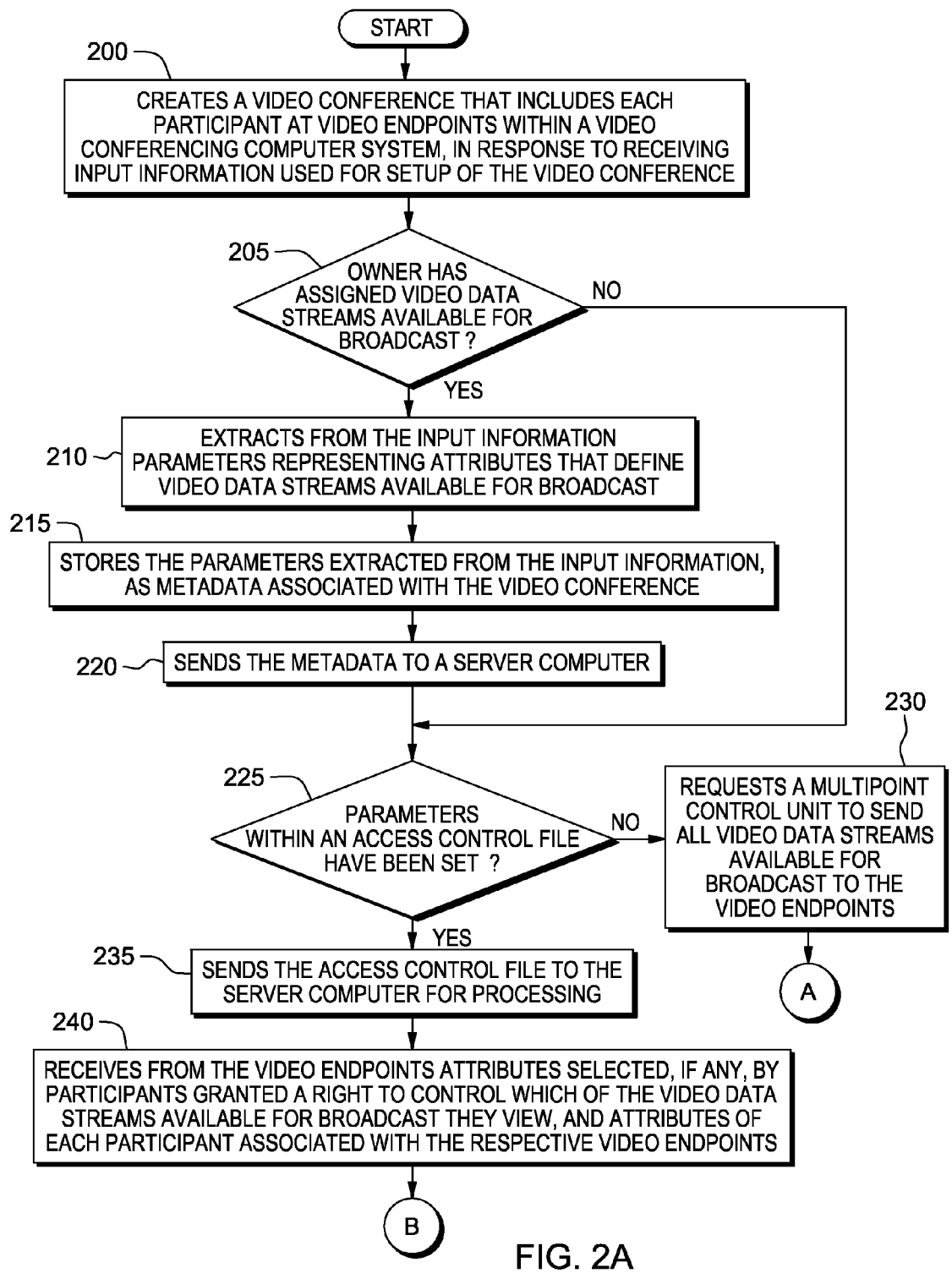
FIGS. 2A and 2B are flowcharts illustrating operations of computer program code for creating a video conference and selecting a video data stream of the video conference to send to one or more of the video endpoints, wherein the selection is based on parameters representing attributes of a participant in the video conference, and wherein the computer program code includes the meeting room client program module and the meeting room server program module according to an embodiment of the present invention.
Figure 2B:
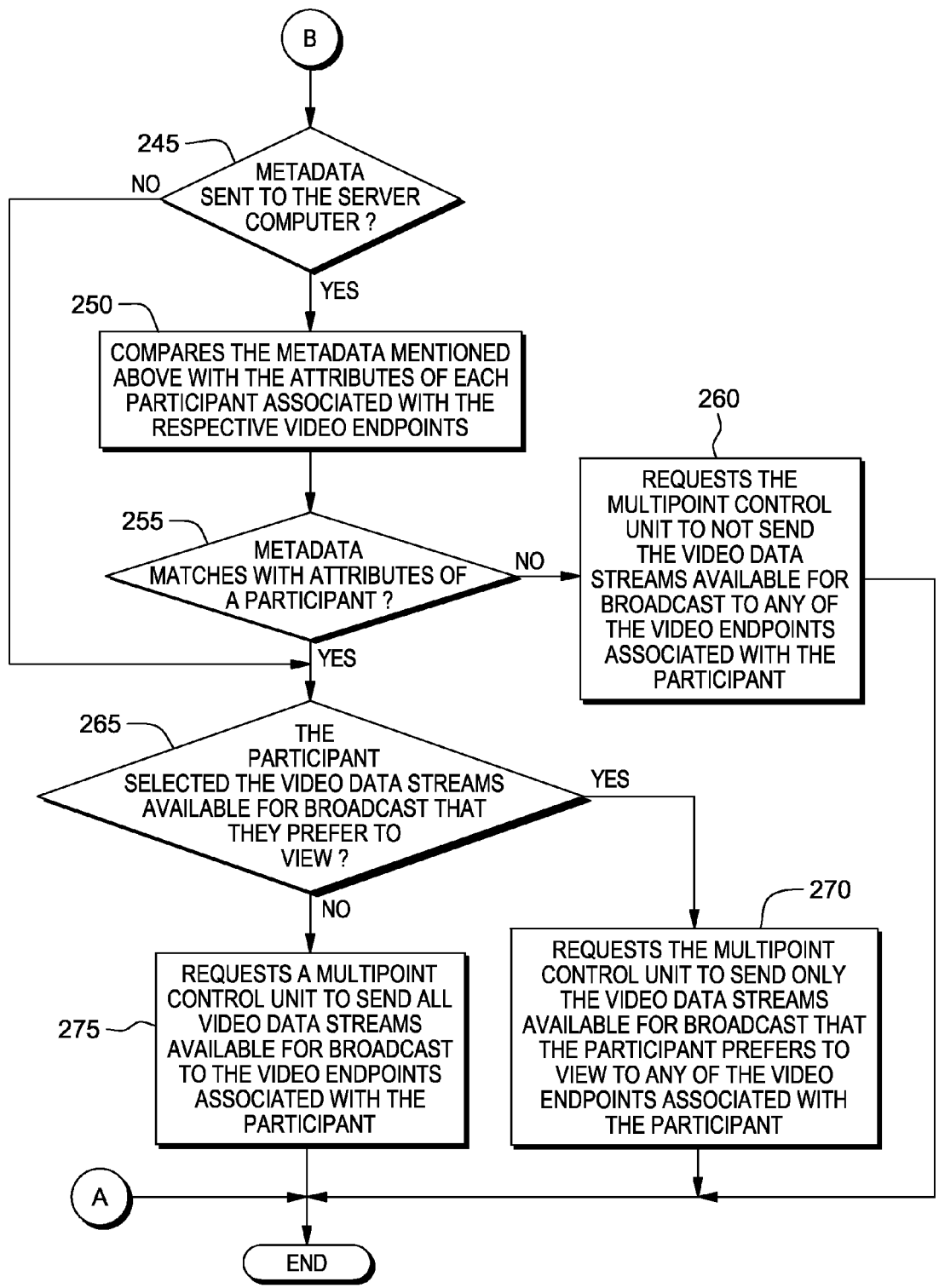

FIGS. 2A and 2B are flowcharts illustrating operations of computer program code for creating a video conference and selecting a video data stream of the video conference to send to one or more video endpoints (e.g., video endpoints 120a-120d) within video conferencing computer system 100, wherein the selection is based on based on parameters representing attributes of a participant in the video conference. In the disclosed embodiment, the computer program code includes each client program module (e.g., meeting room client program modules 115a and 115b) and at least one server program module (i.e., meeting room server program module 140). An end-user can enter input information via meeting room client program module 115a into client computer 110a, wherein the input information can be used for setup of a video conference. Particularly, an end-user can enter the input information into any computer, within video conferencing computer system 100, having the computer program code installed. An end-user that enters the input information for creating the video conference is referred to as an owner of the video conference, and the owner can even be the moderator of the video conference.

The input information, mentioned above, can include a room identifier (ID), a code for an owner to host a video conference, a code for a participant to join the video conference, one or more parameters representing a participant's right to control which of the video data streams available for broadcast they view, and/or parameters representing attributes that define video data streams available for broadcast to video endpoints (e.g., video endpoints 120a-120d). The parameters representing attributes that define the video data streams available for broadcast can be selected from a configurable predefined list of values setup by a person, for example, a system programmer/administrator or even the owner of the video conference. In addition, the owner has the option, via the input information, to set parameters within an access control file in order to grant one or more participants the right to control which of video data streams available for broadcast they view on their respective video endpoints 120a, 120b, 120c, and/or 120d.

In response to meeting room client program module 115a receiving the input information used for setup of a video conference, meeting room client program module 115a creates a video conference that includes each participant at video endpoints 120a-120d within video conferencing computer system 100 (block 200). Each of video endpoints 120a-120d is programmatically configured to send, via multipoint control unit 150 to meeting room server program module 140, video and/or audio, and parameters representing attributes of each participant that it is associated with. Thus, each of video endpoints 120a-120d can have a user interface with functionality for a participant or a system programmer/administrator to input parameters representing attributes of each participant associated with respective video endpoints 120a-120d, wherein the attributes can include: internet protocol addresses (IP addresses) associated with respective video endpoint 120a-120d, a physical address of each participant, a job description of each participant, a membership in a collaborative network, and other attributes based on needs and design requirements of a customer or an end-user of the computer program code. Moreover, based on the input information mentioned above, meeting room client program module 115a determines whether the owner has assigned video data streams available for broadcast (decision block 205). Specifically, meeting room client program module 115a can determine whether the owner has assigned video data streams available for broadcast by parsing the input information for parameters representing attributes selected from the configurable predefined list of values.

Next, if the owner did not assign video data streams available for broadcast (the "NO" branch of decision block 205), then based on the input information meeting room client program module 115a determines whether parameters within the access control file have been set to grant one or more participants a right to control which of video data streams available for broadcast they view (block 225). However, if the owner assigned video data streams available for broadcast (the "YES" branch of decision block 205), then meeting room client program module 115a extracts from the input information parameters representing attributes that define video data streams available for broadcast (block 210). Next, meeting room client program module 115a stores the parameters extracted from the input information, as metadata associated with the video conference (block 215). Specifically, the metadata can be stored locally on client computer 110a, for example in a file or database. Subsequently, meeting room client program module 115a sends the metadata to server computer 135 (block 220). Thus, the metadata can include one or more parameters representing a participant's right to control which of the video data streams available for broadcast they view, and/or one or more parameters representing attributes that define video data streams that are available for broadcast. As a result, meeting room server program module 140 can utilize the metadata received by server computer 135 to determine the video data streams from each video endpoint 120a-120d, that are available for broadcast.

Next, if based on the input information meeting room client program module 115a determines that the owner has not set parameters within the access control file to grant one or more participants the right to control which of video data streams available for broadcast they view (the "NO" branch of decision block 225), then meeting room server program module 140 requests multipoint control unit 150 to send all video data streams available for broadcast to video endpoints 120-120d and computer program code ends (block 230). Otherwise, if client program module 115a determines that the owner has set parameters within the access control file to grant one or more participants the right to control which of video data streams available for broadcast they view (the "YES" branch of decision block 225), then meeting room client program module 115a sends the access control file to server computer 135 for processing by meeting room server program module 140 (block 235).

In one embodiment, the access control file can include a record for each participant in the video conference in which each record has a field for a participant ID, followed by a field for a video endpoint ID that is associated with the participant ID, followed by a field for a video data stream control parameter that is also associated with the participant ID. The access control file can be implemented using Extensible Markup Language (XML) or JavaScript Object Notation (JSON). In addition, in other embodiments the ordering of the fields can be different. Meeting room server program module 140 can use the participant ID within a record to identify a participant, use the video endpoint ID to identify one of video endpoints 120a-120d associated with the participant, and use the video data stream control parameter to determine the participant's right to control which of video data streams available for broadcast they view on their associated video endpoint 120a, 120b, 120c, or 120d. Next, based on a schedule, meeting room server program module 140 receives from video endpoints 120a-120d attributes selected, if any, by participants granted the right to control which of the video data streams available for broadcast they view, and attributes of each participant associated with the respective video endpoints 120a-120d (block 240). The schedule is configurable by the system programmer/administrator, and can execute at least more frequently than on a daily basis.

Subsequently, if metadata was not sent to server computer 135 (the "NO" branch of decision block 245), then meeting room server program module 140 determines whether a participant selected the video data streams available for broadcast that they prefer to view (decision block 265). Otherwise, if metadata was sent to server computer 135 (the "YES" branch of decision block 245), then meeting room server program module 140 compares the metadata mentioned above with the attributes of each participant associated with the respective video endpoints 120a-120d (block 250). Based on the comparisons, if meeting room server program module 140 determines that the metadata does not match with attributes of a participant (the "NO" branch of decision block 255), then meeting room server program module 140 requests multipoint control unit 150 to not send video data streams that are available for broadcast to any of video endpoints 120a-120d associated with the participant (block 260). Subsequently, multipoint control unit 150 executes the request from meeting room server program module 140 and the computer program code ends. Otherwise, if meeting room server program module 140 determines that the metadata matches with attributes of a participant (the "YES" branch of decision block 255), and that the participant selected the video data streams available for broadcast that they prefer to view (the "YES" branch of decision block 265), then meeting room server program module 140 requests multipoint control unit 150 to send only the video data streams available for broadcast that the participant prefers to view to any of video endpoints 120a-120d associated with the participant (block 270). Particularly, the participant can select the video data streams available for broadcast that they prefer to view by specifying criteria via one of video endpoints 120a-120d that is associated with the participant wherein the criteria can include: collocated participants, internal participants, a most active speaker, a presenter only, or only video data streams expressly chosen by the selected participant. Thus, the criteria specified by the participant can be utilized to select specific video data streams to send to any of video endpoints 120a-120d associated with the participant. Subsequently, multipoint control unit 150 executes the request from meeting room server program module 140 and the computer program code ends.

However, if meeting room server program module 140 determines that the participant did not select the video data streams available for broadcast that they prefer to view (the "NO" branch of decision block 265), then meeting room server program module 140 requests multipoint control unit 150 to send all video data streams available for broadcast to video endpoints 120a-120d associated with the participant (block 275). Subsequently, multipoint control unit 150 executes the request from meeting room server program module 140 and the computer program code ends.

Figure 3:
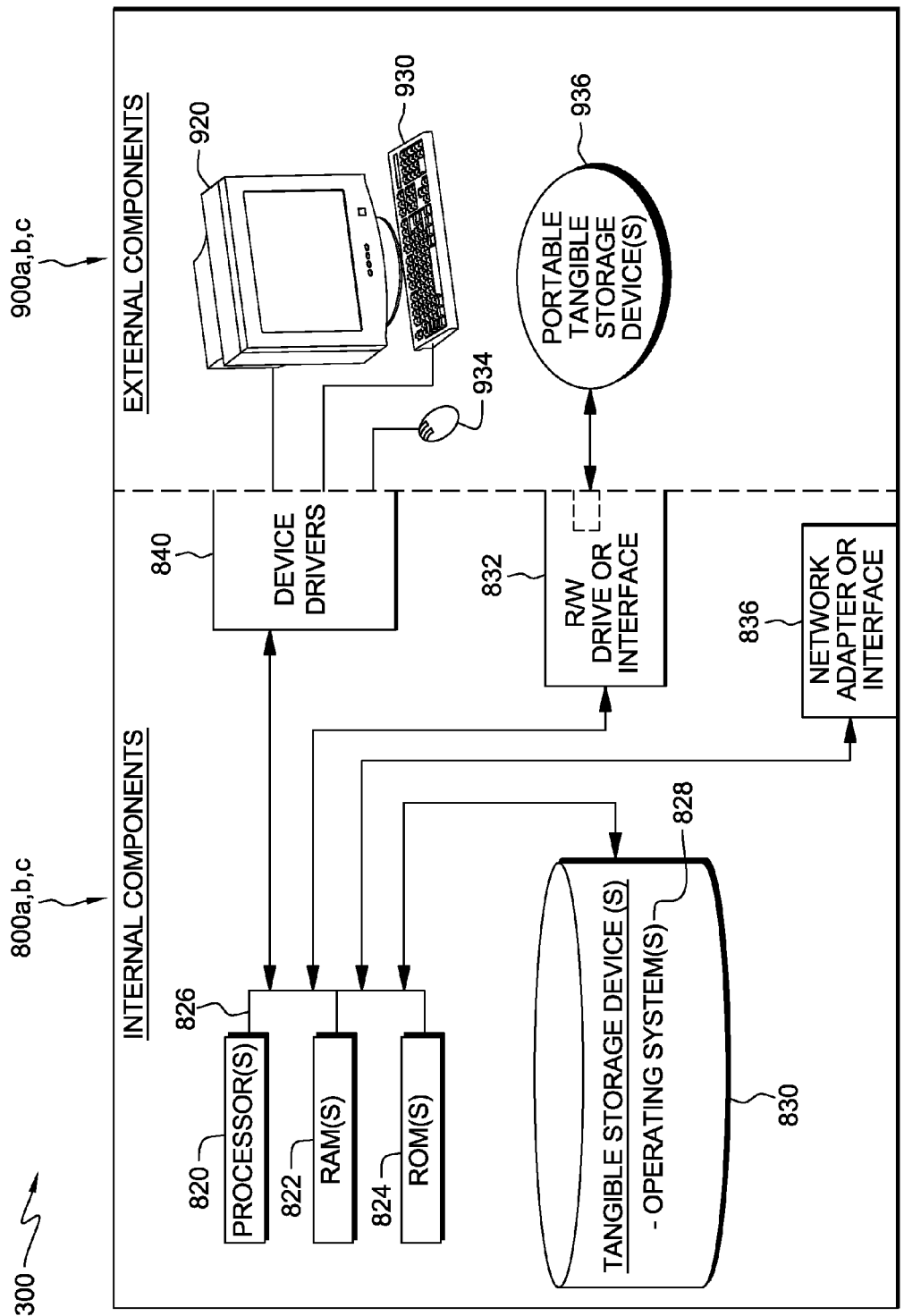
FIG. 3 is a block diagram depicting internal and external components of the client computers and the server computer of FIG. 1 according to an embodiment of the present invention.

FIG. 3 is a block diagram 300 depicting a set of internal components 800a and 800b and a set of external components 900a and 900b that correspond to respective client computer 110a and 110b, as well as a set of internal components 800c and a set of external components 900c that correspond to server computer 135. Internal components 800a-800c each include one or more processors 820, one or more computer readable RAMs 822 and one or more computer readable ROMs 824 on one or more buses 826, and one or more operating systems 828 and one or more computer readable tangible storage devices 830. The one or more operating systems 828 and meeting room client program module 115a and 115b on respective client computers 110a and 110b; and meeting room server program module 140 on server computer 135 are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a-800c includes a R/W drive or interface 832 to read from and write to one or more portable computer readable tangible storage devices 936 such as CD-ROM, DVD, memory stick, magnetic tape, magnetic disk, optical disk or semiconductor storage device. Meeting room client program module 115a and 115b on respective client computers 110a and 110b; and meeting room server program module 140 on server computer 135 can be stored on one or more of the respective portable computer readable tangible storage devices 936, read via the respective R/W drive or interface 832 and loaded into the respective hard drive or computer readable tangible storage device 830.

Furthermore, each set of internal components 800a-800c also includes a network adapter or interface 836 such as TCP/IP adapter card, wireless wi-fi interface card, or 3G or 4G wireless interface card or other wired or wireless communication link. Meeting room client program module 115a and 115b on respective client computers 110a and 110b; and meeting room server program module 140 on server computer 135 can be downloaded to respective client computers 110a and 110b and respective server computer 135 from an external computer or external storage device via a network (for example, the Internet, a LAN, or a WAN) and respective network adapters or interfaces 836. From the network adapter or interface 836, meeting room client program module 115a and 115b on respective client computers 110a and 110b; and meeting room server program module 140 on server computer 135 are loaded into at least one respective hard drive or computer readable tangible storage device 830. The network can comprise copper wires, optical fibers, wireless transmission, routers, firewalls, switches, gateway computers and/or servers.

Each set of external components 900a-900c can include a computer display monitor 920, a keyboard 930, and a computer mouse 934. External components 900a-900c can also include touch screens, virtual keyboards, touch pads, pointing devices, and other human interface devices. Each set of internal components 800a-800c also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments can be implemented. A variety of modifications to the depicted environments can be implemented. Moreover, a variety of modifications to the depicted environments can be made based on design and implementation requirements.

In accordance with the foregoing, a method, a computer system, and a computer program product have been disclosed for selecting a video data stream of a video conference to send to a video endpoint associated with a video conference participant, based on parameters representing attributes of each participant in the video conference. However, numerous modifications substitutions can be made without deviating from the scope of an embodiment of the invention. Therefore, one or more embodiments of the invention have been disclosed by way of example and not limitation.

What is claimed is:

1. A computer implemented method for selecting a video data stream of a video conference to send to a video endpoint, the method comprising:
   receiving input information set(s) respectively corresponding to one or more video endpoints in a video conference, with input information of each input information set including: (i) participant attributes related to characteristics of participant(s) located at the corresponding video endpoint, and (ii) preference parameters related to preferred video streams of the participant(s) located at the corresponding video endpoint;
   for each video endpoint, parsing the corresponding set of input information for preference parameters to determine whether there are video data streams available for broadcast that meet the preference parameters;
   for each video endpoint, parsing the corresponding set of input information for participant attributes to determine whether, based on the participant attributes of the set of input information, an access control file grants the participant(s) located at the video endpoint corresponding to the set of input information a right to control which of the video data streams available for broadcast will be sent to their video endpoint location; and
   for each video endpoint, on condition that the participant(s) located at the video endpoint corresponding to the set of input information a right to control which of the video data streams available for broadcast will be sent to their video endpoint location, sending, to the video endpoint, a set of video stream(s) indicated by the preference parameters in the input information set corresponding to the video endpoint;
   wherein the access control file includes at least one record for each of the participants in the video conference in which each record has a field for a participant identifier (ID), a field for a video endpoint ID that is associated with the participant ID, and a field for a video data stream control parameter that is also associated with the participant ID; and
   wherein the preference parameters include at least one of the following types of specifying criteria: collocated participants, internal participants, most active speaker, and/or presenter(s) only.

2. A computer program product comprising:
   a non-transitory storage device structured to store machine executable instructions; and
   machine executable instructions stored on the non-transitory storage device, the machine executable instruction including a plurality of instruction sets respectively programmed to:
      receive input information set(s) respectively corresponding to one or more video endpoints in a video conference, with input information of each input information set including: (i) participant attributes related to characteristics of participant(s) located at the corresponding video endpoint, and (ii) preference parameters related to preferred video streams of the participant(s) located at the corresponding video endpoint,
      for each video endpoint, parse the corresponding set of input information for preference parameters to determine whether there are video data streams available for broadcast that meet the preference parameters,
      for each video endpoint, parse the corresponding set of input information for participant attributes to determine whether, based on the participant attributes of the set of input information, an access control file grants the participant(s) located at the video endpoint corresponding to the set of input information a right to control which of the video data streams available for broadcast will be sent to their video endpoint location, and
      for each video endpoint, on condition that the participant(s) located at the video endpoint corresponding to the set of input information a right to control which of the video data streams available for broadcast will be sent to their video endpoint location, send, to the video endpoint, a set of video stream(s) indicated by the preference parameters in the input information set corresponding to the video endpoint;
   wherein the access control file includes at least one record for each of the participants in the video conference in which each record has a field for a participant identifier (ID), a field for a video endpoint ID that is associated with the participant ID, and a field for a video data stream control parameter that is also associated with the participant ID; and
   wherein the preference parameters include at least one of the following types of specifying criteria: collocated participants, internal participants, most active speaker, and/or presenter(s) only.

3. A computer system comprising:
   set of processor(s) structured execute machine executable instructions; and
   machine logic structured and/or programmed to cause the set of processor(s) to:
      receive input information set(s) respectively corresponding to one or more video endpoints in a video conference, with input information of each input information set including: (i) participant attributes related to characteristics of participant(s) located at the corresponding video endpoint, and (ii) preference parameters related to preferred video streams of the participant(s) located at the corresponding video endpoint,
      for each video endpoint, parse the corresponding set of input information for preference parameters to determine whether there are video data streams available for broadcast that meet the preference parameters,
      for each video endpoint, parse the corresponding set of input information for participant attributes to determine whether, based on the participant attributes of the set of input information, an access control file grants the participant(s) located at the video endpoint corresponding to the set of input information a right to control which of the video data streams available for broadcast will be sent to their video endpoint location, and
      for each video endpoint, on condition that the participant(s) located at the video endpoint corresponding to the set of input information a right to control which of the video data streams available for broadcast will be sent to their video endpoint location, send, to the video endpoint, a set of video stream(s) indicated by the preference parameters in the input information set corresponding to the video endpoint;
   wherein the access control file includes at least one record for each of the participants in the video conference in which each record has a field for a participant identifier (ID), a field for a video endpoint ID that is associated with the participant ID, and a field for a video data stream control parameter that is also associated with the participant ID; and wherein the preference parameters include at least one of the following types of specifying criteria: collocated participants, internal participants, most active speaker, and/or presenter(s) only.

\* \* \* \* \*